(12) United States Patent
Gmirya (10) Patent No.: US 6,655,915 B2
(45) Date of Patent: Dec. 2, 2003

(54) DRIVE SYSTEM FOR THE RETRACTION/ EXTENSION OF VARIABLE DIAMETER ROTOR SYSTEMS

(75) Inventor: Yuriy Gmirya, Rego Park, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 28 days.

(21) Appl. No.: 10/136,124

(22) Filed: May 1, 2002

(65) Prior Publication Data

US 2003/0206802 A1 Nov. 6, 2003

(51) Int. Cl.$^7$ ............................................. B64C 11/28
(52) U.S. Cl. ..................... 416/88; 416/89; 416/170 R
(58) Field of Search .......................... 416/87, 88, 89, 416/170 R; 74/640

(56) References Cited

U.S. PATENT DOCUMENTS

| | | | |
|---|---|---|---|
| 1,992,866 A | * | 2/1935 | Rosenberg et al. ............ 70/150 |
| 2,996,121 A | | 8/1961 | Stub |
| 5,299,912 A | * | 4/1994 | Fradenburgh et al. ......... 416/87 |
| 5,642,982 A | * | 7/1997 | Matuska et al. .............. 416/87 |
| 6,019,578 A | * | 2/2000 | Hager et al. ................. 416/87 |
| 6,030,177 A | * | 2/2000 | Hager ........................ 416/87 |
| 6,454,532 B1 | * | 9/2002 | Gmirya ....................... 416/87 |

* cited by examiner

Primary Examiner—Edward K. Look
Assistant Examiner—Dwayne J. White
(74) Attorney, Agent, or Firm—Carlson, Gaskey & Olds (57) ABSTRACT

A drive system for a variable diameter rotor (VDR) system includes a plurality of rotor blade assemblies with inner and outer rotor blade segments. The outer blade segment being telescopically mounted to the inner blade segment. The VDR retraction/extension system includes a drive housing mounted at the root of each blade. The housing supports a spool assembly, a harmonic gear set and an electric motor. The spool assembly includes a pair of counter rotating spools each of which drive a respective cable which extends through the interior of the inboard rotor blade section and around a pulley mounted to the outboard rotor blade section. In operation, the electric motor drives the harmonic gear set which rotates the counter rotating spools. Rotation of the spools causes the cables to be wound onto or off their respective spool consequently effecting retraction/extension of the pulley and the attached outboard rotor blade section relative the inboard rotor blade section. As each blade drive system is independently driven by a separate electrical motor, each independent VDR blade assembly is independently positionable.

18 Claims, 6 Drawing Sheets

DRIVE SYSTEM FOR THE RETRACTION/EXTENSION OF VARIABLE DIAMETER ROTOR SYSTEMS

BACKGROUND OF THE INVENTION

This invention was made with government support under Contract No.: NCC2-9020 awarded by NASA and SAC. The government therefore has certain rights in this invention.

The present invention provides a drive system for a variable diameter rotor blade system, and more particularly to a harmonic gear and spool system to selectively extend and retract the variable diameter rotor blade system.

A tilt rotor or tilt wing aircraft typically employs a pair of rotor systems which are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller-driven fixed-wing aircraft.

Variable Diameter Rotor (VDR) systems are known to provide distinct advantages. That is, when the plane of the rotor is oriented horizontally, the rotor diameter is enlarged for improved hovering efficiency and, when oriented vertically, the rotor diameter is reduced for improved propulsive efficiency.

One known example of a VDR blade assembly provides an outer blade segment configured to telescope over a torque tube member. A retraction/extension mechanism includes a planetary gear arrangement which is selectively drivable in either direction by a control shaft coaxially mounted within the rotor system drive shaft. The control shaft is selectively driven to selectively rotate a reeling assembly and wind/unwind a cable attached to each outer blade segment. Controlling the extension and/or retraction of the outer blade segments relative to their torque tubes thereby varies the rotor diameter.

Each VDR blade assembly extends and retracts through rotation of the single reeling assembly. Disadvantageously, rotation of the single reeling assembly may result in relative differences in the position of each VDR blade assembly relative to the others. Such differences in the relative positioning may result in disbalance of the rotor system.

Accordingly, it is desirable to provide a VDR retraction/extension system which is light and compact while minimizing the potential for disbalance in the rotor system.

SUMMARY OF THE INVENTION

The VDR retraction/extension system according to the present invention includes a drive housing mounted at the root of each blade. The housing mounts the blade to a hub assembly and a spool assembly, a harmonic gear set and an electric motor. The spool assembly includes a pair of counter rotating spools each of which drive a respective cable. Each cable extends from the spool assembly through the interior of the inboard rotor blade section, along the longitudinal axis thereof, and around a pulley. The pulley is mounted to the outboard rotor blade section.

A cable end of each cable is attached to the inboard rotor blade section. The load applied by centrifugal force which operates to telescope the outboard rotor blade section relative the inboard rotor blade section is shared between each cable portion such that each cable portion carries only one-fourth the total blade centrifugal load. The relatively high centrifugal force load is thereby distributed through multiple components and redundant paths which decreases the fatigue and load requirements necessary for each member to advantageously provide for smaller diameter cables and a reduction in the overall size and weight of the drive system.

In operation, the electric motor drives the harmonic gear set which rotates the counter rotating spools. Rotation of the spools causes the cables to be wound onto or off their respective spool consequently effecting retraction/extension of the pulley and the attached outboard rotor blade section relative the inboard rotor blade section. As each blade drive system is independently driven by a separate electrical motor, each independent VDR blade assembly is independently positionable. That is, each VDR blade assembly on the hub may be individually positioned.

The present invention thereby provides a VDR retraction/extension system which is light and compact while minimizing the potential for disbalance in the rotor system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
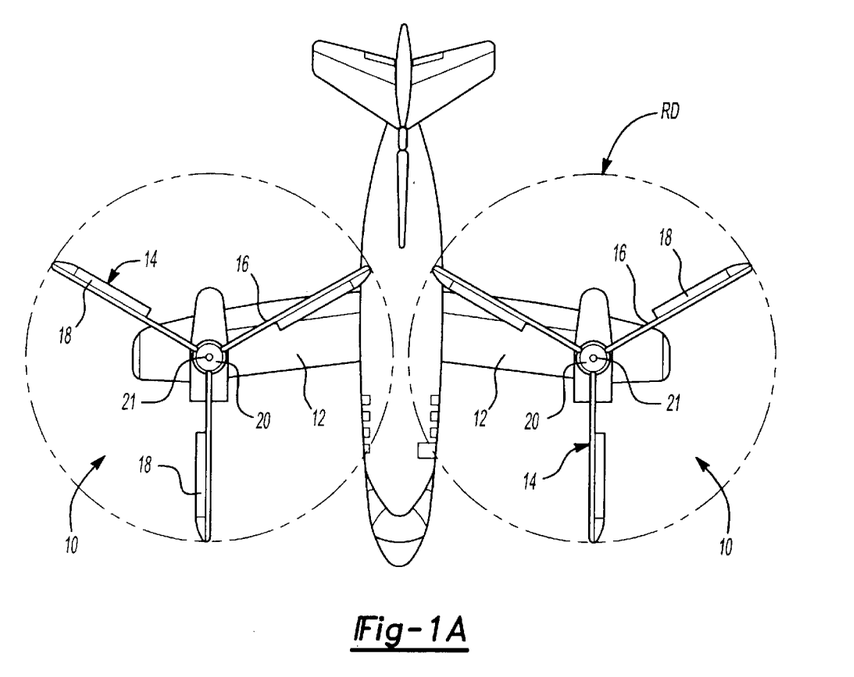
FIG. 1A is a plan view of a tilt-rotor aircraft illustrating the variable diameter rotor system according to the present invention in its horizontal position.

FIG. 1A schematically illustrates a tilt rotor aircraft that includes a pair of variable diameter rotor blade (VDR) systems 10. The VDR systems 10 are shown pivotally mounted on laterally extending wing sections 12 of an aircraft. The VDR systems 10 are pivotable between a horizontal or hover flight position, shown in FIG. 1A, and a vertical or forward flight position, shown in FIG. 1B.

Figure 1B:
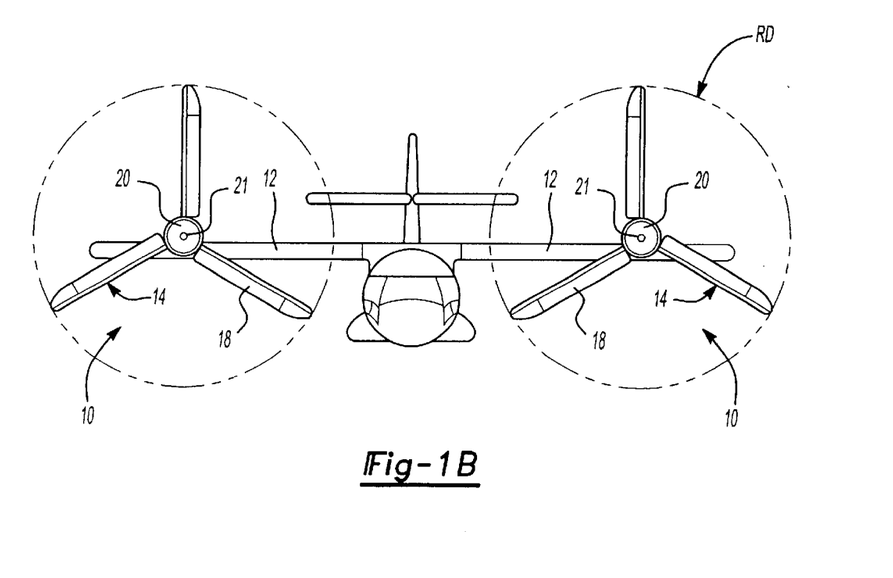
FIG. 1B is a front view of a tilt-rotor aircraft illustrating the variable diameter rotor system according to the present invention in its vertical position.

Each VDR system 10 includes a plurality of variable diameter rotor blade assemblies 14 which are capable of being extended and retracted to vary the size of the rotor diameter (RD) as required. In order to effectuate the change in diameter, the VDR blade assemblies 14 include an inboard rotor blade section 16 and an outboard rotor blade section 18 which telescopes relative to the inboard rotor blade section 16. The VDR blade assembly 14 is mounted to and driven by a rotor hub assembly 20 about an axis of rotation 21.

Figure 2:
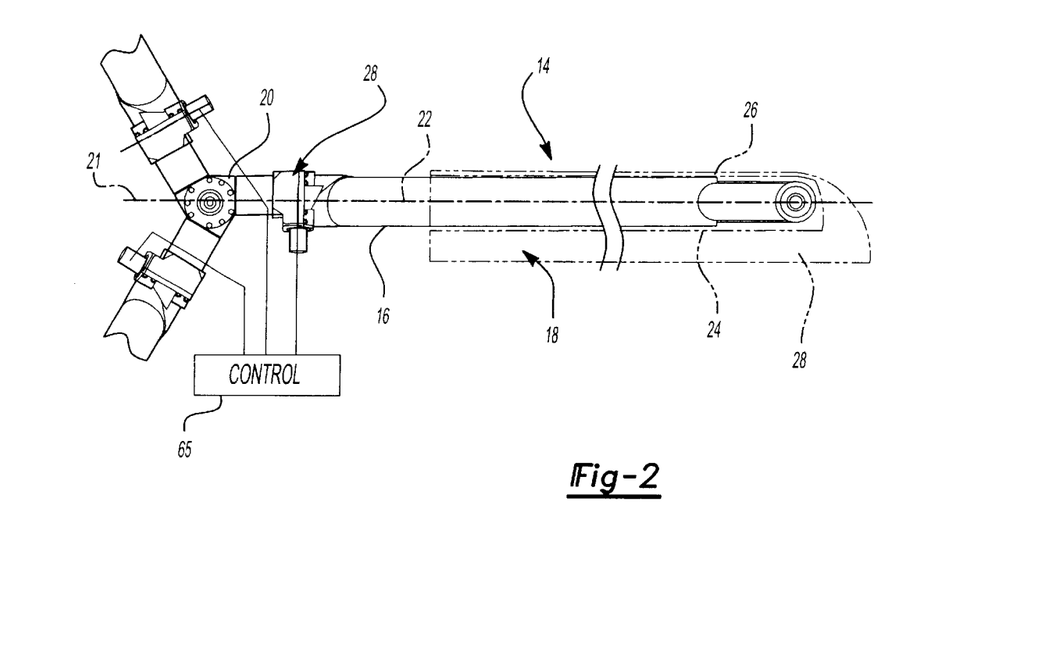
FIG. 2 is an expanded top view of a Variable Diameter rotor blade assembly.

Referring to FIG. 2, each VDR blade assembly 14 includes the movable outboard rotor blade section 18 which telescopes over the inboard rotor blade section 16 (also referred to as a torque tube) along a longitudinal axis 22. The outboard rotor blade section 18 includes a hollow spar member 24 which is enveloped by a leading edge 26 and a trailing edge 27 to define the requisite aerodynamic contour of the outboard rotor blade section 18. The outboard rotor blade section 18 is telescopically retractable and extendable relative to the inboard rotor blade section 16 by a blade drive system 28 attached to the rotor hub assembly 20. Each VDR blade assembly 14 includes an independent blade drive system 28, for example only, a hub assembly 20 having three blades includes three blade drive assemblies 28. It should be understood that although three blades are illustrated in the disclosed embodiments a hub having any number of VDR blade assemblies will benefit from the present invention. It should be further understood that the present invention is not limited to an aircraft and non-vehicle systems such as wind-power systems will also benefit from the present invention.

Figure 3:
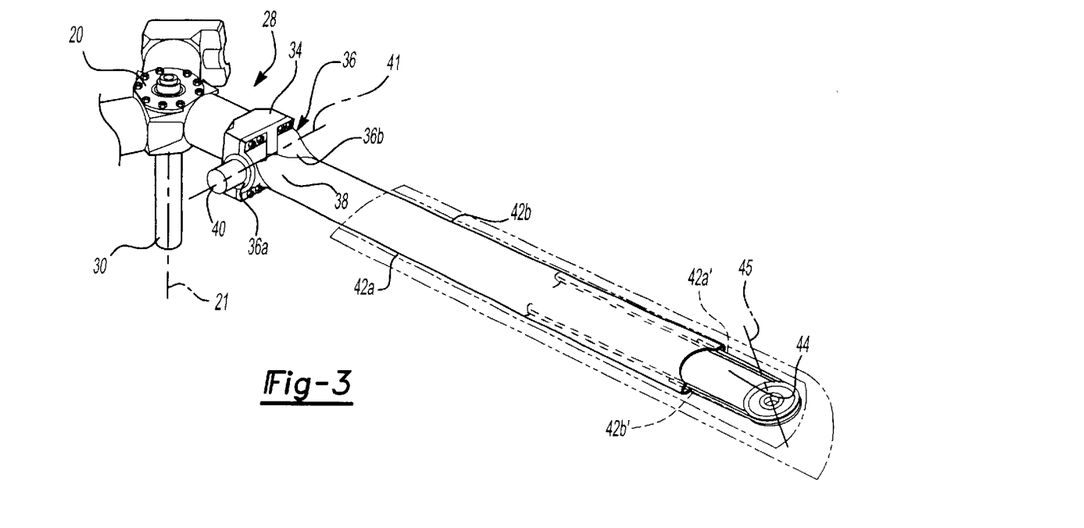
FIG. 3 is a partial phantom sectional view of a VDR drive system designed according to the present invention.

Referring to FIG. 3, the blade drive assembly 28 is illustrated without the inboard rotor blade 16 section and outboard rotor blade section 18. Although a single VDR blade assembly 14 and blade drive system 28 will be described, it should be understood that the description applies to each of the VDR blade assemblies 14. The rotor hub assembly 20 is mounted to a main rotor shaft 30 which rotatably drives the rotor hub assembly 20 about the rotational axis 21. The main rotor shaft 30 is attached to a transmission (not shown) which rotates the main rotor shaft in a prescribed direction and speed.

Figure 4:
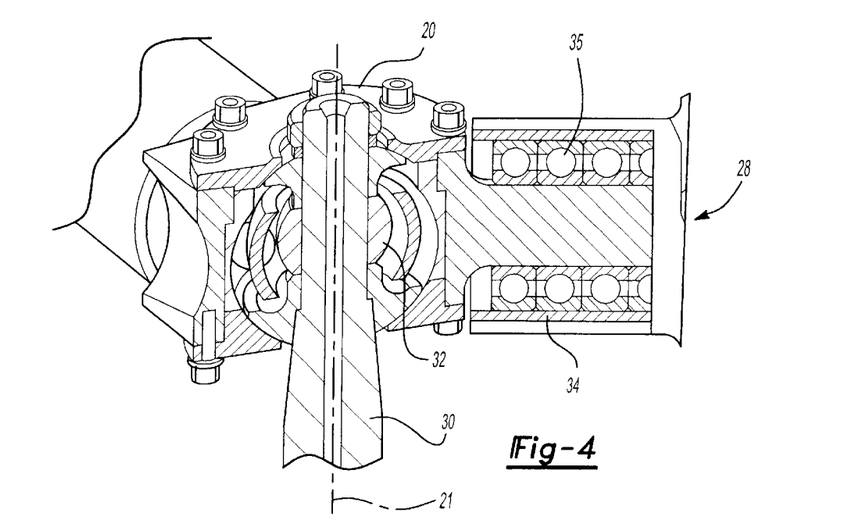
FIG. 4 is a partial sectional view of a gimbaled mount for a VDR drive system.
Figure 5:
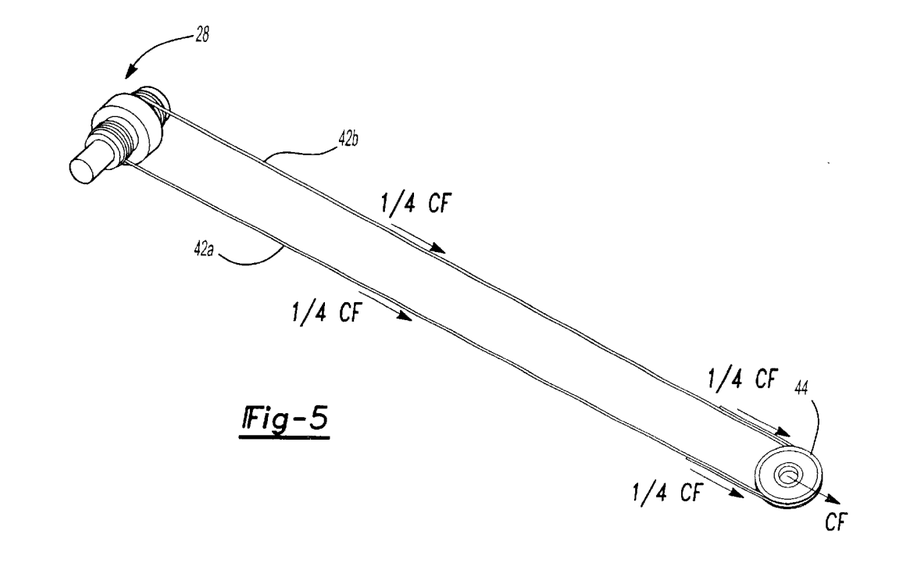
FIG. 5 is a schematic view VDR drive system illustrating a load distribution.
Figure 6:
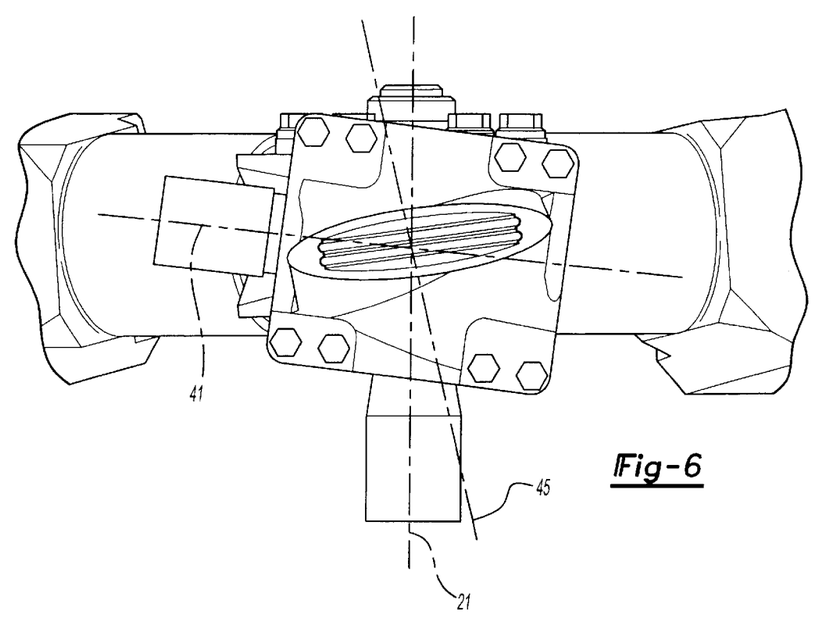
FIG. 6 is an outboard end view of a VDR drive system.

The main rotor shaft 30 is preferably attached to the rotor blade assemblies 14 through a gimbaled bearing assembly (illustrated schematically at 32; FIG. 4). The gimbaled bearing 32 transmits rotor thrust loads to the main rotor shaft and permits the hub assembly 20 to have limited angular (pivotal) movement with respect to the main rotor shaft 30. The gimbaled bearing 32 provides tilting of the rotor plane relative to the rotational axis 21 resulting in a thrust vector to maneuver the aircraft in the helicopter mode. This stiff inplane gimbaled configuration provide for stable operation in both helicopter and airplane modes of flight, however, other arrangements will also benefit from the present invention.

The blade drive system 28 includes a drive housing 34 which mounts the VDR blade assembly 14 to the rotor hub assembly 20 through bolts or the like. That is, the housing 34 is mounted at the root of each inboard rotor blade segment 16. The housing 34 provides pitch articulation through a pitch bearing set 35 (FIG. 4) which mounts the drive housing 34 to the hub assembly 20. The housing 34 supports a spool assembly 36, a harmonic gear set 38 and an electric motor 40.

The spool assembly 36, the harmonic gear set 38 and the electric motor 40 are located along a common inboard rotation axis 41. The inboard rotation axis 41 is preferably located along the chord of the VDR blade assembly 14 and generally perpendicular to the longitudinal axis 22. That is, axes 21 and 41 are transverse to each other but do not intersect each other in the same plane. It should be understood that the inboard rotational axis 41 pitches with the VDR blade assembly 14.

The spool assembly 36 preferably includes a pair of counter rotating spools 36a, 36b, each of which drive a respective cable 42a, 42b. Preferably, the cable includes multi-fiber materials and/or multi-cable construction to provide redundant load paths for ballistic survivability. Each cable 42a, 42b extends from the spool assembly 36 through the interior of the inboard rotor blade section 16, along the longitudinal axis 22 and around a pulley 44.

A cable end 42a', 42b' of each cable 42a, 42b is attached to the inboard rotor blade section 16, preferably along a predefined longitudinal length. As the cable end 42a', 42b' are attached proximate the open outboard end of the inboard rotor blade section 16, the attachment thereof operates to increase the stiffness of the inboard rotor blade section 16. Moreover, the load applied by centrifugal force which operates to telescope the outboard rotor blade section 18 relative the inboard rotor blade section 16 is shared between each cable 42a, 42b such that each cable portion is subjected to only one-fourth the total blade centrifugal load (FIG. 4). The relatively high centrifugal force load is thereby distributed through multiple components and redundant paths which decreases the fatigue and load requirements necessary for each member to advantageously provide for smaller diameter cables and a reduction in the overall size and weight of the drive system.

Figure 7:
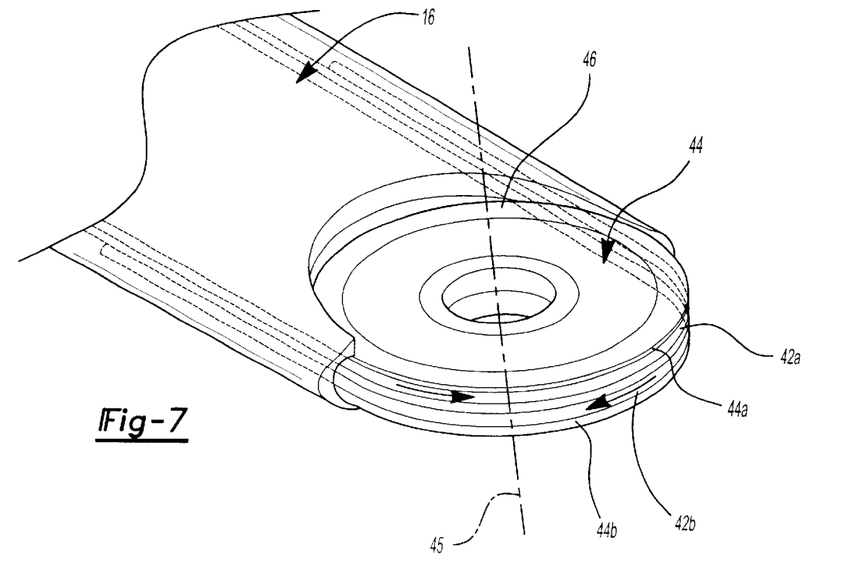
FIG. 7 is an expanded view of an outboard end of Variable Diameter rotor blade assembly.

The pulley 44 is mounted to the outboard rotor blade section 18 for rotation around an outboard rotational axis 45. Pulley 44 is preferably two counter rotating pulleys including a first pulley 44a which rotates opposite the direction of a second pulley 44b. The rotational axis 45 is transverse the inboard rotation axis 41 (FIG. 3). An outboard end of the inboard rotor blade section 16 provides a partially arcuate receptor area 46 (FIG. 7). The receptor area 46 corresponds with a diameter of the pulley 44 such that the pulley 44 fits in mating engagement within the receptor area 46 when the outboard rotor blade section 18 is fully retracted.

Figure 8A:
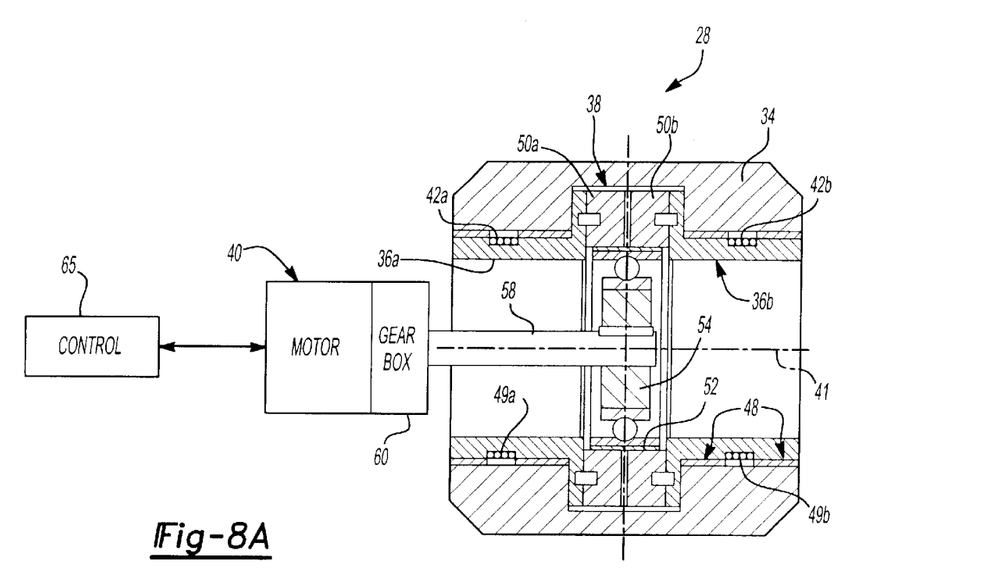
FIG. 8A is a sectional view of the VDR drive system illustrated a harmonic gear system according to the present invention.

Referring to FIG. 8A, a sectional view of the blade drive system 28 is illustrated. The counter rotating spools 36a, 36b are rotationally supported within the housing 34 by sleeve bearings 48 or the like and attached to each side of the harmonic gear set 38 for rotation about the inboard rotation axis 41. Preferably a groove 49a, 49b receives each of the cables 42a, 42b in winding engagement with its respective counter rotating spool 36a, 36b.

Figure 8B:
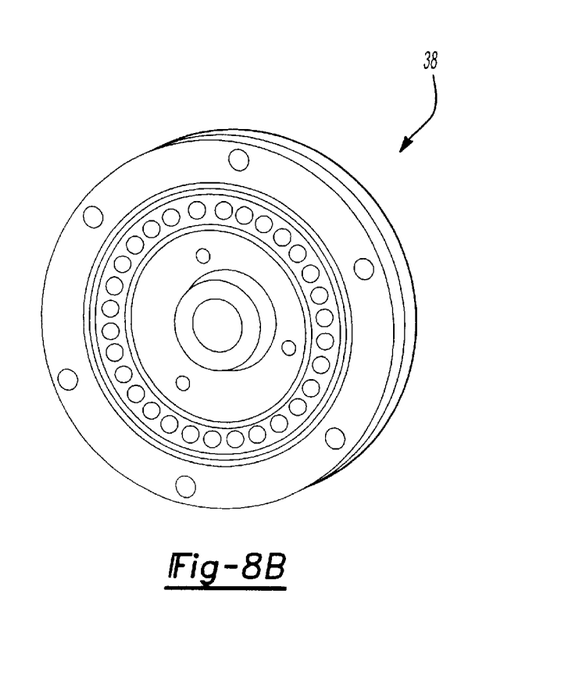
FIG. 8B is a expanded perspective view of the harmonic gear system of FIG. 8A.
Figure 8C:
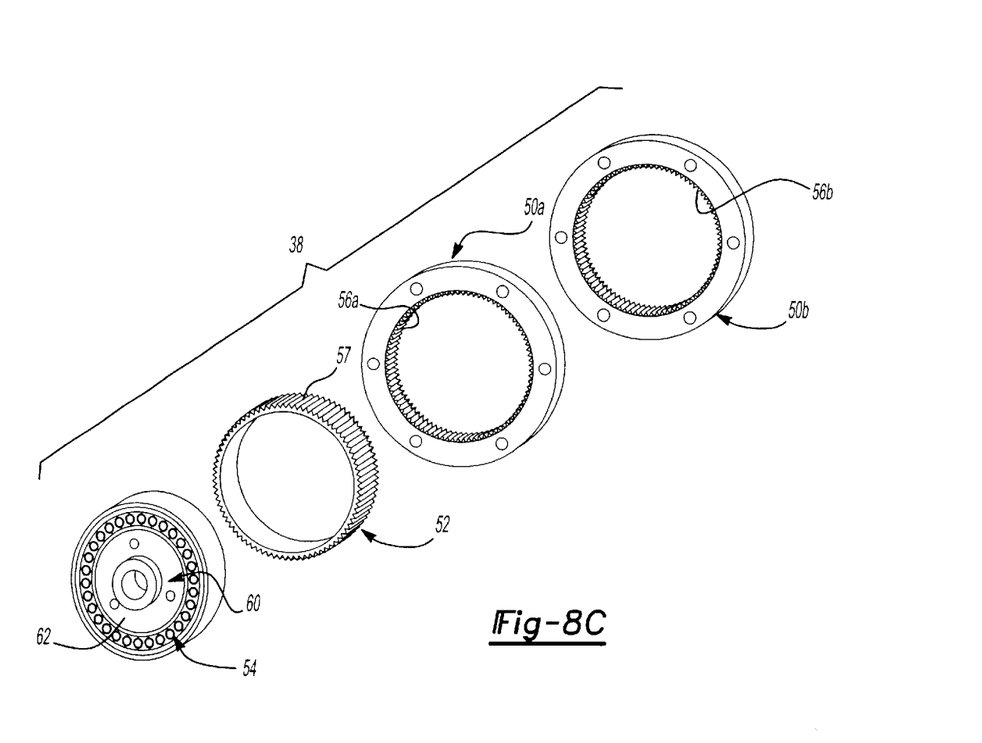
FIG. 8C is an exploded view of harmonic gear system of FIG. 8B.

The harmonic gear set 38 includes a pair of counter rotating circular splines 50a, 50b, a flex spline 52 and a wave generator 54 (also illustrated in FIG. 8C) such as the HDB phasing differential gear sets manufactured by Harmonic Drive Technologies of Peabody, Mass.

The wave generator 54 is driven by a shaft 58. Shaft 58 is driven by the electric motor 40 through an electric motor gearbox (illustrated schematically at 60). The gearbox 60 is preferably an internal planetary gearhead having a reduction ratio of 6.75:1, however, other gearboxes and ratios will also benefit from the present invention.

The flex spline 52 includes a plurality of external gear teeth 57 about the flex spline outer diameter. The flex spline 52 is a substantially non-rigid cylinder manufactured of a spring steel or the like. The number of external flex spline teeth 57 about the flex spline 52 are less numerous than the number of internal gear teeth 56a within rotating circular spline 50a. Preferably, a gear reduction of 350:1 is provided. Circular spline 50b has the same number of internal gear teeth 56b of the external gear teeth 57 of the flex spline 52.

Because the number of internal gear teeth 56b are equal to the number of external gear teeth 57, the circular spline 50b rotates at the same speed and in the same direction as the flex spline 52.

The wave generator 54 includes an elliptical disk 60 enclosed within a bearing assembly 62. The wave generator 54 is mounted within the bore of the flex spline 52 (also illustrated in FIG. 8B) to impart the shape of the elliptical disk 60 to the flex spline 52. By mounting the wave generator 54 within the bore of the flex spline 52, the external flex spline teeth 57 engage the internal gear teeth 56 within each counter rotating circular splines 50a, 50b at two equally spaced locations 180 degrees apart on their respective circumferences. A positive gear mesh is thus formed at these points of engagement.

In operation, shaft 58 drives wave generator 54 through the electric motor 40 and electric motor gearbox 60. The wave generator 54 rotates and causes the external flex spline teeth 57 to sequentially engage the internal gear teeth 56a, 56b of the circular splines 50a, 50b. As the flex spline 52 has fewer teeth than circular spline 50a, one revolution of wave generator 54 causes relative motion between the flex spline 52 and the circular spline 50a in an opposite direction as the flex spline 52. As the flex spline 52 has the same number of teeth as circular spline 50b, circular spline 50b rotates at the same speed and in the same direction as the flex spline 52. Preferably, the number of teeth and the difference therebetween equates to a gear reduction of 350:1.

The reduction ratio may be calculated, by the following relationship:

$$\text{Reduction ratio} = Z_1/Z_2 - Z_1,$$

Where:

$Z_1$=number of teeth on the flexible gear; and
$Z_2$=number of teeth on the fixed gear.
Thus, if $Z_1$=700, and $Z_2$=702⇨

$$\text{The reduction ratio} = 700/702 - 700 = 350.$$

Each circular spline 50a, 50b is mounted to a respective counter rotating spool 36a, 36b for rotation therewith. Rotation of the circular splines 50a, 50b causes the spools 36a, 36b to rotate relative the housing 34. Rotation of the spools 36a, 36b thereby causes the cables 42a, 42b to be wound onto or off their respective spool 36a, 36b consequently effecting retraction/extension of pulley 44 (FIG. 2) and the attached outboard rotor blade section 18 relative the inboard rotor blade section 16. Preferably, the spools 36a, 36b are driven at a rotational speed which effects full retraction/extension in about a 10 to 20 second interval.

As each blade drive system 28 is independently driven by a separate electrical motor, each independent VDR blade assembly 14 can be independent positioned. That is, each VDR blade assembly 14 on the hub 20 may be individually positioned relative the other VDR blade assemblies by a controller (illustrated schematically at 65; FIG. 2). This eliminates the major disadvantage of single drum reel mechanism where relative positioning of the blades, disbalance and compensation for lifetime cable stretch require additional complex systems.

Since the circular splines 50a, 50b are not radially fixed, they will react against the cable loads and self align the spool 36a, 36b position when input torque is applied. Self-alignment is valid even when shaft 58 is locked such that the load is always shared between cables 42a, 42b. Moreover, articulation of the VDR blade assembly 14 does not effect such self-alignment.

Other harmonic gear systems with other wave generators will also benefit from the present invention. In addition other control schemes for relative positioning of each independent VDR blade assembly will also benefit from the present invention. Such independent positioning may be particularly beneficial to non vehicle based applications The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A retraction/extension system for an rotor blade assembly, said rotor blade assembly having an outboard blade section telescopically mounted to an inboard blade section, said retraction/extension system comprising:
   a harmonic gear system attached to the inboard blade section;
   an electric motor for driving said harmonic gear system;
   a spool assembly driven by said harmonic gear system, said spool assembly defined along an inboard rotation axis;
   a pulley mounted to the outboard blade section; and
   a cable windingly received with said spool assembly said cable extending at least partially around said pulley and a segment of said cable attached to the inboard blade section, rotation of said spool assembly to effect telescopic transition of said pulley and the outboard blade section relative to the inboard blade section.

2. The system as recited in claim 1, further comprising a main rotor shaft attached to a rotor hub mounting the rotor blade assembly, said main rotor shaft defining a rotational axis substantially perpendicular to the inboard rotation axis.

3. The system as recited in claim 1, wherein said inboard rotation axis is defined along a chord of the inboard blade section.

4. The system as recited in claim 1, wherein said pulley rotates about an outboard rotation axis transverse said inboard rotation axis.

5. The system as recited in claim 1, wherein said cable extends within the inboard rotor blade section.

6. The system as recited in claim 1, wherein said segment of said cable is fixedly mounted within the inboard blade section along a predetermined length.

7. The system as recited in claim 1, further comprising a sleeve bearing rotationally supporting said spool assembly.

8. The system as recited in claim 1, wherein said spool assembly comprises a first and a second spool, said first spool rotatable in a direction opposite said second spool.

9. The system as recited in claim 8, further comprising a second cable windingly received with said second spool.

10. The system as recited in claim 8, wherein said harmonic gear system includes a first and a second circular spline, said first circular spline driving said first spool and said second circular spline driving said second spool.

11. The system as recited in claim 10, wherein said harmonic gear system includes a wave generator which drives said first and said second circular spline.

12. The system as recited in claim 1, wherein an end of the inboard blade section comprises a partially arcuate open end to receive said pulley.

13. A retraction/extension system for a variable diameter rotor blade system having a rotor hub and a multiple of rotor blade assemblies, each of said rotor blade assemblies having an outboard blade section telescopically mounted to an inboard blade section, said retraction/extension system for each of said multiple of rotor blade assemblies comprising:
- a harmonic gear system attached to the inboard blade sections, said harmonic gear system comprising a first and a second circular spline;
- an electric motor for driving said harmonic gear system, said first circular spline rotatable in a direction oppose said second circular spline;
- a spool assembly defined along an inboard rotation axis, said spool assembly comprising a first spool rotated by said first circular spline and a second spool rotated by said second circular spline;
- a pulley mounted to the outboard blade section along an outboard rotation axis generally perpendicular to said inboard rotation axis; and
- a first cable windingly received with said first spool, said cable extending at least partially around said pulley and a segment of said first cable attached to the inboard blade section;
- a second cable windingly received with said second spool, said cable extending at least partially around said pulley and a segment of said second cable attached to the inboard blade section such that rotation of said spool assembly effect telescopic transition of said pulley and the outboard blade section relative to the inboard blade section.

14. The system as recited in claim 13, further comprising a main rotor shaft attached to the rotor hub, said main rotor shaft defining a rotational axis generally perpendicular to the inboard rotation axis.

15. The system as recited in claim 13, wherein said inboard rotation axis is defined along a chord of the inboard rotor blade section.

16. The system as recited in claim 13, wherein an end of the inboard rotor blade section comprises a partially arcuate open end to receive said pulley when the outboard blade section is retracted.

17. The system as recited in claim 13, wherein said first cable and said second cable extends within the inboard rotor blade section.

18. The system as recited in claim 13, wherein said pulley comprises a first and second counter-rotating pulley rotatable about a common axis.

* * * * *